United States Patent [19]
Szabó et al.
[11] 3,832,646
[45] Aug. 27, 1974

[54] COMMON MODE NOISE SUPPRESSING CIRCUIT ADJUSTMENT SEQUENCE

[75] Inventors: András I. Szabó, Export; Ricardo A. Diaz, Plum, both of Pa.

[73] Assignee: Westinghouse Electric Corporation, Pittsburgh, Pa.

[22] Filed: Oct. 6, 1972

[21] Appl. No.: 295,616

[52] U.S. Cl. .......... 330/30 D, 330/31
[51] Int. Cl. .......... H03g 11/00
[58] Field of Search .......... 330/30 D, 31

[56] References Cited

UNITED STATES PATENTS

| | | | |
|---|---|---|---|
| 3,451,006 | 6/1969 | Grangaard | 330/30 D |
| 3,546,564 | 12/1970 | Denny | 330/30 D |

OTHER PUBLICATIONS

Melen et al., "IC Operational Amplifiers," Howard W. Sams Co., Publishers, Indianapolis, 1971; pp. 77, 89 and 104.

*Primary Examiner*—Rudolph V. Rolinec
*Assistant Examiner*—William D. Larkins
*Attorney, Agent, or Firm*—E. F. Possessky

[57] ABSTRACT

A circuit is disclosed for suppressing common mode signals of relatively high amplitude. Illustratively, the common mode suppression circuit includes an operational amplifier having a specified operating range and an input network for attenuating the input signal to a degree that the largest expected common mode signal is attenuated so as not to exceed the specified operating range of the operational amplifier. Further, the gain of the operational amplifier is adjusted by a further, output network to compensate for the attenuation imparted to the input signal by the input network. In an illustrative embodiment of this invetion, the input network includes a voltage dividing network for attenuating the input signal and capacitive elements for blocking impulsive, common mode noise of very high amplitude and short duration. In one illustrative embodiment of this invention, the second network for controlling the gain of the operational amplifier includes at least first and second resistive elements connected in series between the output and an input of the operatinal amplifier and a third resistive element connected from the common point therebetween, to ground.

2 Claims, 8 Drawing Figures

COMMON MODE NOISE SUPPRESSING CIRCUIT ADJUSTMENT SEQUENCE

CROSS-REFERENCE TO RELATED APPLICATION

Reference is made to a concurrently filed and related U.S. Pat. application which is assigned to the present Assignee: Ser. No. 295,792, filed Oct. 6, 1972, entitled, "Analog Data Acquisition System," filed in the names of András I. Szabó, Richardo A. Diaz and Kenneth E. Daggett.

BACKGROUND OF THE INVENTION

1. Field of the Invention

This invention relates to circuits for suppressing noise and, in particular, to those circuits for suppressing common mode noise signals.

2. Description of the Prior Art

A need has arisen in modern instrumentation and control systems for accessing analog signals from a plurality of widely separated data points and of transmitting the accessed signals to a central processor or data acquisition system as described in the above-referenced co-pending application. As described, this data acquisition system basically includes a multiplexer module responsive to address signals derived from a computer device for selecting one of the plurality of data points and for transmitting the selected input data to an analog-to-digital converting module, wherein the analog input data is converted into a binary representation thereof. Upon further command of the computer device, the data acquisition system transmits the binary data representation to the computer device. The computer device, in accordance with its program, then may process the input data to derive suitable control factors to be applied to the apparatus under its direction. In order to acquire and transmit data to a central processor such as a computer, large analog systems are used in such industrial applications as process control, supervisory instrumentation, data logging, automatic testing, etc.

The normal mode noise present in such analog systems can be maintained typically at a sufficiently low level by using shielded cabling and known instrumentation techniques. However, problems occur where the common mode noise reaches very high levels. In industrial applications, where noise and interference of of relatively high levels exist, a system specification may require satisfactory operation with 150V RMS, 60 Hz common mode noise present on the analog inputs, as well as with 2,000V peak value, 1 microsecond duration impulsive common mode noise present. As will be discussed later in more detail, such high common mode noise levels, make the direct use of semiconductor devices impractical. For this reason, fully guarded floating instrumentation systems are commonly employed in such large analog systems, despite the resulting high cost of their use.

Fully guarded, floating instruments comprise, essentially, a metal enclosure which completely surrounds the instrument and is connected either directly or through an electromechanical multiplexer to the shield of the instrumentation cable which brings the input signal thereto. Normally, the instrumentation cable shield is grounded at the signal source and normally includes a twisted pair of wires completely surrounded by suitable shielding. To obtain satisfactory operation, the insulation incorporated into the housing is made as perfect as possible and further, the capacitive coupling between the metal enclosure and the ground at the receiving end is made as small as possible. Where these conditions cannot be met, significant common mode current can flow in the shield of the cable, which in turn introduces stray normal mode noise due to the inevitable unbalances existing in the signal source, cable and instrument.

The use of a floating instrument with well-insulated housing is used in conjunction with adequate shielding; such precautions have been found satisfactory for simply, direct read-out instruments. However, if the instrument utilizes complex electronic circuitry and/or is required to access and to transmit data from data points which are not floating with it, it may be difficult, if not impossible, to meet the requirements for high insulation including low capacitive coupling to ground. Floating power supplies and interfacing circuitry which may meet such high standards are inevitably of high cost.

Further, as described in the above-referenced, co-pending application, suitable input or multiplexer devices are used to isolate the cables interconnecting the data points and the data acquisition system. Typically, such multiplexer devices comprise a series of mechanical relays or switching devices which are unaffected by the presence of high noise or interference. In other applications, suitable isolating transformers or devices employing optical coupling may be used to achieve the desired isolation.

An operational amplifier 10, as shown in FIG. 1, has an inherent common mode noise rejection due, primarily, to the fact that it functions to provide an output signal as the difference of the input signals $V_1$ and $V_2$. Thus, common mode noise present between the inputs and ground would be substantially eliminated from the output of the operational amplifier 10. As shown in FIG. 1, the input signal $V_1$ is applied through a resistor $R_1$ to a minus or inverting input of the operational amplifier 10, whereas the second input signal $V_2$ is applied through another resistor $R_1$ to a plus or non-inverting input. The last-mentioned resistor $R_1$ is connected also through a resistor $R_2$ to ground. A second resistor $R_2$ is connected between the output of the operational amplifier 10 and its inverting input. The output $V_O$ of the operational amplifier is given by the following equation:

$$V_O = (R_2/R_1)\,(V_2 - V_1) \qquad [1]$$

It is seen by examination of equation [1] that the output is a function of the difference of the input signals $V_1$ and $V_2$. The operating range of such operational amplifiers incorporating semi-conductor elements, is typically in the order of 15 V. If a voltage greater than the operating range is applied to either or both of the two inputs of the operational amplifier 10, it is very possible that the operational amplifier would be seriously damaged, if not destroyed. In the specification contemplated below, the presence of high voltage, common mode pulses would prevent the normal use of such operational amplifiers.

No representation is made that any prior art considered herein is the best pertaining prior art or that the considered prior art can be interpreted differently from the interpretations placed on it herein.

SUMMARY OF THE INVENTION

It is therefore an object of this invention to eliminate or attenuate substantially the common mode noise that may be imposed upon the transmission of data signals.

It is a more particular object of this invention to employ operational amplifiers in a manner to utilize their inherent noise rejection capabilities, but to eliminate the risk of damage thereto due to the presence of high amplitude, common mode noise.

In accordance with these and other objects, the present invention provides a common mode noise conditioning or suppressing circuit utilizing an operational amplifier and its inherent noise rejection capabilities to suppress common mode noise and further employing a first or input network, for attenuating input signals to a level within the operating range of the operational amplifier and a second or output network whereby the gain of the operational amplifier is enhanced to compensate for the attenuation imparted to the input signal. Illustratively, the first or input network comprises a voltage dividing circuit of at least two impedance elements, typically resistors. The second network illustratively comprises at least first and second impedance elements interconnected between the output of the operational amplifier and an input thereto, and a second impedance element connected from the point of interconnection therebetween, to ground. In accordance with the teachings of this invention, the values of the impedance elements of the input network are so selected that the input signals as well as the common mode noise is attenuated. The impedance elements of the second or output network are adjusted whereby the gain of the operational amplifier is enhanced to compensate for the previous attenuation.

As a further aspect of this invention, the input network includes a capacitive element associated with each input of such value to suppress substantially impulsive common mode noise of very high amplitude and short duration.

A still further aspect of this invention involves the critical adjustment of the foregoing circuit, to compensate for the inherent tolerances of the incorporated components. In particular, the following adjustments are made, in the order enumerated:

1. With the inputs tied to zero, the output of the operational amplifier is adjusted to zero;
2. With a single input tied to ground, and a known voltage applied between the other input and ground, the gain factor of that input signal is adjusted critically;
3. A common mode DC signal of known amplitude is applied to both inputs and a resistance element of the input network is adjusted so that the output signal $V_O$ of the operational amplifier is zero; and
4. A large amplitude common mode AC signal is applied to both inputs and one of the aforementioned capacitances is adjusted so that the output $V_O$ is zero. It is significant that by calibrating the aforedescribed circuit in the above sequence of steps, the circuit may be adjusted critically without the repeating of these calibration steps.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figures 1, 2:
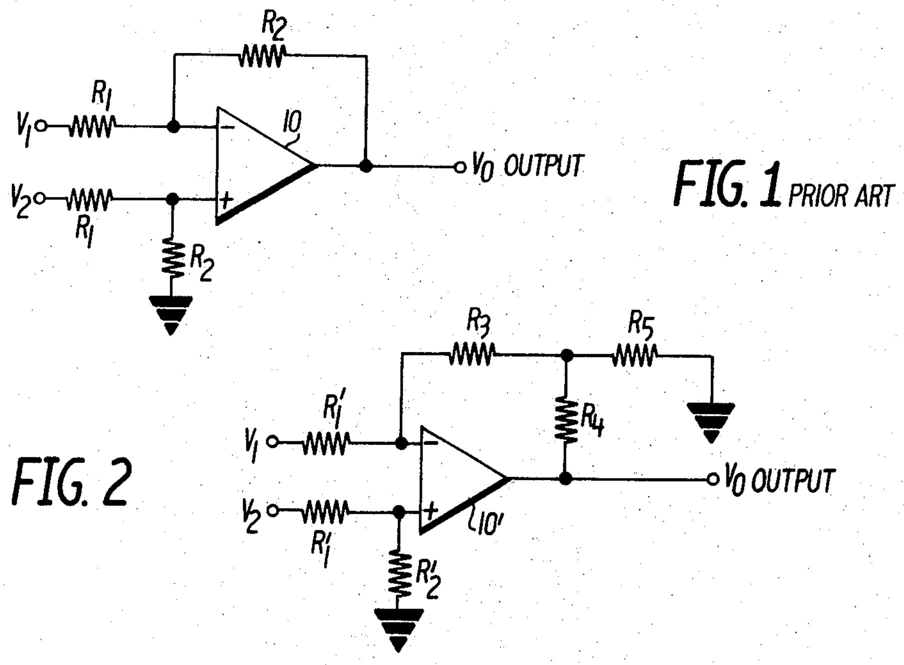
FIG. 1 PRIOR ART, FIG. 2
FIG. 1 shows schematically an operational amplifier connected in a circuit of the prior art.
FIG. 2 is a schematic diagram of a common mode noise conditioning or suppressing circuit in accordance with teachings of this invention.

With regard to the drawings and in particular to FIG. 2, there is shown a schematic diagram of a common mode noise suppressing circuit in accordance with the teachings of this invention. In particular, the circuit comprises an operational amplifier 10′ having a minus or inverting input to which a $V_1$ input signal is applied through a resistor $R'_1$. A second input signal $V_2$ is applied through a resistor $R'_1$ to the plus or noninverting input of the operational amplifier 10′. In accordance with teachings of this invention, the input network includes a resistance $R'_2$ connected to the second input to form with the previously mentioned resistor $R'_1$ associated with the noninverting input signal, a voltage dividing network whereby the input signals are attenuated, as will be explained more fully later, by a factor dependent upon the relative values of the resistive elements $R'_2$ and $R'_1$. In addition, the output of the operational amplifier 10′ is connected through a pair of resistive elements $R_4$ and $R_3$ to the inverting input of the amplifier 10′. Further, the point of interconnection between the resistive elements $R_4$ and $R_3$ is connected by a resistive element $R_5$ to ground. The output voltage $V_O$ of the operational amplifier 10′ is given by the following equation:

$$V_O = K_2 V_2 + K_1 V_1 \qquad [2]$$

where, $$K_l = - R_3 R_4 \ _2] \ _{R3} R_5 + R_4 R_5 \ / R'_1 R_5 \qquad [3]$$

and, $$K_2 = (R'_2 / R'_1 + R'_2)[R_4 (R'_1 + R_3 + R_5) + R_5 (R'_1 + R_3) / R'_1 R_5] \qquad [4]$$

In order to achieve perfect DC common mode rejection, the values of $K_1$ and $K_2$ are set so that the algebraic sum thereof is zero, i.e.

$$K_1 + K_2 = 0 \qquad [5]$$

This condition is satisfied when:

$$R'_2 = R_3 + (R_4R_5/R_4 + R_5)$$ [6]

An inspection of equation [4] reveals that it can be divided into two factors. The first factor indicates that the input signal is attenuated by a ratio $R'_2/R'_1 + R'_2$, whereas the second factor $R_4(R'_1 + R_3 + R_5) + R_5(R'_1 + R_3)/R'_1R_5$ is the amount by which the attenuated signal is amplified by the operational amplifier 10'. For example, if the ratio of the resistances of $R'_2$ to $R'_1$ is 1 to 19, then an attenuation of the input signal of 1 to 20 is achieved. If a unit gain is desired, the second or gain factor, $R_4(R'_1 + R_3 + R_5) + R_5(R'_1 + R_3)/R'_1R_5$, must be equal to 20. Of course, any other overall gain could be realized by selecting suitable attenuation and gain factors.

Figure 3:
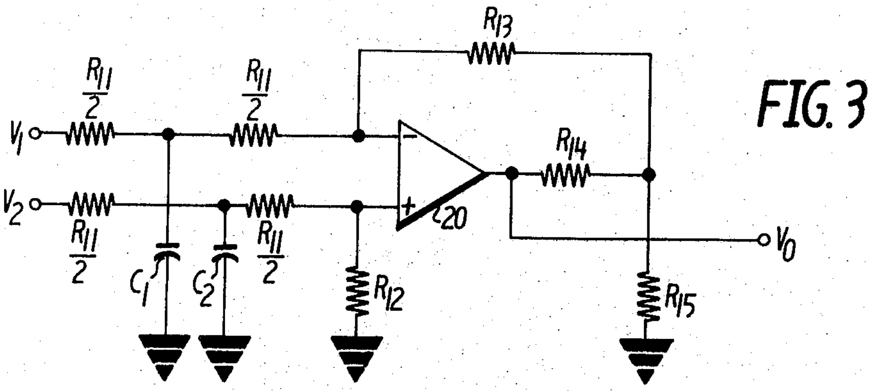
FIG. 3 is a schematic diagram of an alternative embodiment of the circuit shown in FIG. 2 incorporating capacitors connected to the inputs of an operational amplifier.

With regard to FIG. 3, there is shown an alternative embodiment of this invention similar to that shown in FIG. 2. In particular, the first input signal $V_1$ is applied through a pair of series-connected resistive elements $R_{11}/2$ to a negative or inverting input of an operational amplifier 20, whereas a second input $V_2$ is applied through a pair of series-connected resistive elements $R_{11}/2$ to a positive noninverting input of the operational amplifier 20. In addition to the aforementioned resistive elements, the input network includes a first capacitor $C_1$ connected to the intermediate connecting point of resistive elements $R_{11}/2$ associated with the inverting input $V_1$, and capacitive element $C_2$ connected to the intermediate connecting point of the resistive element $R_{11}/2$ associated with the noninverting input $V_2$. The capacitors $C_1$ and $C_2$ are included in the input network for blocking the very high peak voltages of short duration associated with impulsive common mode noise. If the capacitors were not present, the common mode impulsive noise could drive the inputs of the operational amplifier 20 beyond its specified range with resulting damage and destruction. Further, a resistive element $R_{12}$ is connected between the positive or noninverting input of the operational amplifier 20 and ground. The second or output network includes resistive elements $R_{13}$ and $R_{14}$ connected in series between the output of the operational amplifier 20 and its negative or inverting input. The point of interconnection between resistive elements $R_{13}$ and $R_{14}$ is connected by resistive element $R_{15}$ to ground.

Thus, with regard to FIG. 3, an input network is formed whereby the input signals, as well as the impulsive common mode noise imposed thereon, are attenuated to be within the range of the operational amplifier 20. In particular, the second input signal $V_2$ is attenuated by a voltage dividing circuit formed of resistive elements $R_{11}/2$ and $R_{12}$. The first input signal $V_1$ is attenuated by a voltage dividing circuit formed of resistive elements $R_{11}$12, $R_{13}$, $R_{14}$ and $R_{15}$. If the values of the aforementioned resistive elements are selected in accordance with equations [3], [4] and [5] as set out above, the impedance presented by resistive element $R_{12}$ will be substantially equal to that provided by the circuit combination of resistive element $R_{13}$ connected in series to the parallel connected resistive elements $R_{14}$ and $R_{15}$. Thus, both of the input signals $V_1$ and $V_2$ are equally attenuated to be within the operating range of the operational amplifier 20.

An output network comprised of resistive elements $R_{13}$, $R_{14}$ and $R_{15}$ serves to increase the overall gain of the amplifier 20, thereby to compensate for the attenuation imposed upon the input network. In a functional sense, the addition of resistive elements $R_{14}$ and $R_{15}$ may be thought of as acting as a voltage dividing circuit whereby the output signal is attenuated before being fed back to the inverting input of the operational amplifier 20; as a result of this attenuation of the feedback signal, the overall gain of the amplifier is increased.

Figure 4:
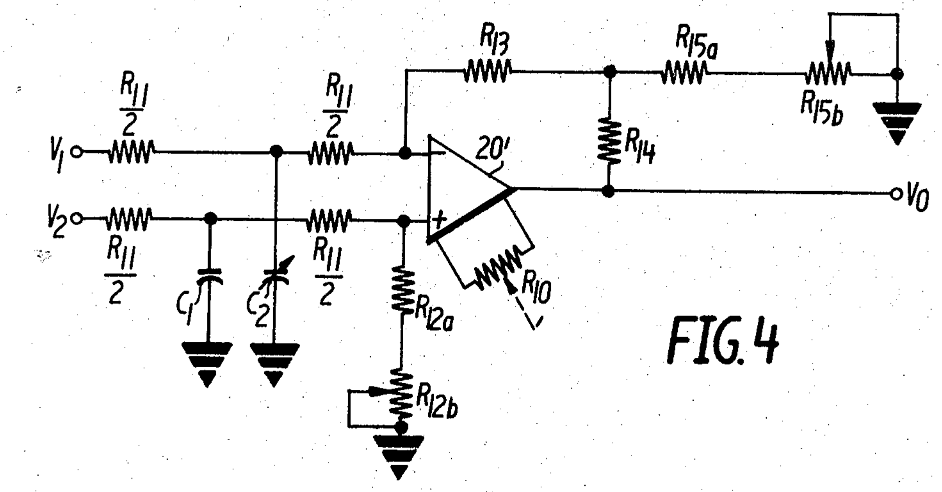
FIG. 4 is a schematic diagram of a more detailed embodiment of the circuit shown in FIG. 3.

With regard to FIG. 4, there is shown a common mode conditioning circuit similar to that shown in FIG. 3, modified to permit critical adjustment thereof. Significantly, to achieve the high degree of balance desired in the signal conditioning circuit, it is essential to provide a number of adjustments in order to compensate for various tolerances inherent in commercially available components. The letters and numerals used in FIG. 4 to identify the various elements are similar to those used to identify the corresponding elements of the circuit of FIG. 3. As shown in FIG. 4, resistive element $R_{15}$ has been replaced by a fixed resistive element $R_{15a}$ and a variable resistive element $R_{15b}$. Similarly, resistive element $R_{12}$ has been replaced by a fixed resistive element $R_{12a}$ and a variable resistive element $R_{12b}$. In the method of calibration, four adjustments are made in the order enumerated:

1. Zero adjustment;
2. Differential mode gain adjustment;
3. DC common mode adjustment; and
4. AC common mode adjustment.

First, to effect the zero adjustment or internal balance of the operational amplifier 20' of FIG. 4, the inverting and noninverting inputs are connected to ground and the resistor $R_{10}$ is adjusted so that the output $V_O$ of the operational amplifier 20' is zero. Next, the differential mode gain adjustment is made by connecting the second input to ground, applying a known DC potential to the first input and adjusting the resistive element $R_{15b}$ until the ratio of the measured $V_O$ to the known $V_1$ equals $K_1$ as defined by equation [3] above. With reference to FIG. 3, this adjustment ensures the proper values of $R_{15}$ with regard to the values of the other resistive elements, and of $K_1$ as defined by equation [3]. In turn, the DC common mode calibration is made by applying a known DC potential $V_{CM}$ to each of the first and second inputs and adjusting the resistive element $R_{12b}$ until the output $V_0$ equals zero, thereby ensuring that $K_1 + K_2 = 0$. Finally, an AC common mode adjustment is made by connecting a known AC potential $V_{CM}$ to each of the inverting and noninverting inputs and adjusting the variable capacitor $C_2$ until the output $V_O$ of the operational amplifier 20' is zero to ensure that the impedance values of $C_1$ and $C_2$, as well as stray capacitances, are balanced. It is noted that the DC common mode adjustment described above could be replaced by a calibration step wherein the inverting input is connected to ground, a known DC potential is applied to the non-inverting input and the value of resistor $R_{12b}$ is adjusted until the ratio of measured $V_O$ to known $V_2$ equals $K_2$ as defined by equation [4]. However, it has been found easier to connect the potential $V_{CM}$ to each of the inputs and adjust the resistive element $R_{12b}$ to provide the relative value of the resistive elements in accordance with $K_2$ as defined by equation [4]. By making the above-described adjustments to the circuit of FIG. 4, the signal conditioning circuit may be balanced to a high degree. The high degree of independence of the circuit design assures that these adjustments may be performed only once to achieve the desired high degree of balance.

Figure 5:
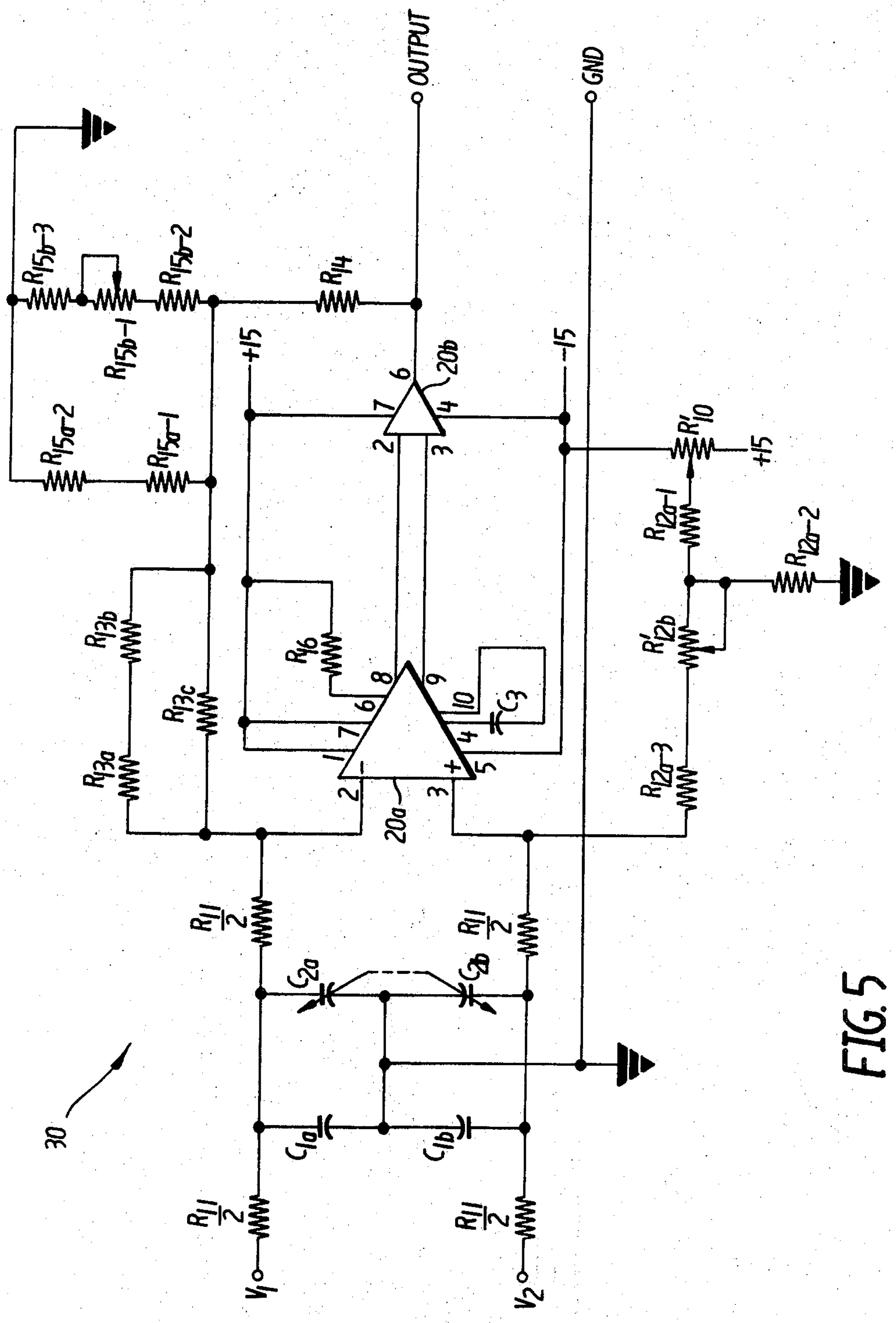
FIG. 5 is a schematic diagram of a further embodiment of this invention.

With regard to FIG. 5, there is shown an actual embodiment of this invention that has been constructed and upon which tests have been conducted to demonstrate the effective suppression of common mode noise signals. It may be understood that impedance elements including resistive and capacitive elements, may not be obtained in the precise values that are needed to insert into a high-precision circuit such as described herein. In such instances, it may be necessary to achieve the desired resistive values to assemble available resistive elements in series and/or in parallel to achieve the precise value required of the circuit. In FIG. 5, the numerals identifying the various circuit elements correspond to those numerals as identified with regard to the circuit of FIG. 4. In certain instances where precise values of impedance elements were not available, combinations of elements were connected together to provide the desired impedance values. For example, resistive elements $R_{13a}$, $R_{13b}$ and $R_{13c}$ are connected as shown in FIG. 5 to provide a precise value of resistive element $R_{13}$ as shown in FIG. 4. In similar fashion, the resistive elements $R_{15a}$ and $R_{15b}$ as connected in series as shown in FIG. 4, are provided in an actual embodiment by connecting a first pair of series-connected resistive elements $R_{15a\text{-}1}$ and $R_{15a\text{-}2}$ in parallel with series-connected resistive elements $R_{15a\text{-}1}$, $R_{15b\text{-}2}$ and $R_{15b\text{-}3}$. In an analogous manner, the series-connected resistive elements $R_{12a}$ and $R_{12b}$ correspond to resistive elements $R_{12a\text{-}1}$, $R_{12a\text{-}2}$ and $R_{12a\text{-}3}$, and variable resistive element $R'_{12b}$, respectively. In the circuit of FIG. 5, the operational amplifier comprises first and second operational amplifiers **20*a* and 20*b* connected in cascade. The zero adjustment resistor is shown in FIG. 5 as comprising resistive element $R'_{10}$ interconnected between +15V and −15 V power sources. In a manner as described above, the resistor $R'_{10}$ may be adjusted to apply a voltage between +15 V and −15V to the noninverting input terminal of the operational amplifier 20*a*** to achieve thereby the desired zero adjustment of the operational amplifiers. Resistive element $R_{15b\text{-}1}$ is adjusted for calibrating the differential gain and resistive element $R'_{12b}$ is adjusted to achieve DC common mode calibration. Further, the input network includes capacitive elements $C_{2a}$ and $C_{2b}$ interconnected from the inverting input and the noninverting input, respectively, to ground. In a manner as described above, the AC common mode balance is established by adjusting the differential, variable capacitors $C_{2a}$ and $C_{2b}$.

In an illustrative embodiment of this invention, the impedance elements of the circuit shown in FIG. 5 have the following values:

| | |
|---|---|
| $R'_{10}$ | 50KΩ ± 5% |
| $R_{11}/2$ | 200KΩ ± 0.025% |
| $R_{12a\text{-}1}$ | 162KΩ ± 1% |
| $R_{12a\text{-}2}$ | 49.9Ω ± 1% |
| $R_{12a\text{-}3}$ | 20KΩ ± 0.025% |
| $R'_{12b}$ | 50Ω ± 5% |
| $R_{13a}$ | 2MΩ ± 1% |
| $R_{13b}$ | 243KΩ ±1% |
| $R_{13c}$ | 20KΩ ± 0.025% |
| $R_{14}$ | 500Ω ± 0.025% |
| $R_{15a\text{-}1}$ | 10Ω ± 1% |
| $R_{15a\text{-}2}$ | 500Ω ± 0.025 % |
| $R_{15b\text{-}1}$ | 5KΩ ± 5% |
| $R_{15b\text{-}2}$ | 17.8KΩ ±1% |
| $R_{15b\text{-}3}$ | 17.8KΩ ± 1% |
| $20_a$ | μA727 differential preamplifier |
| $20_b$ | μA741 operational amplifier |
| $R_{16}$ | 2MΩ ± 5% |
| $C_{1a}$ | 680pf ± 1% |
| $C_{1b}$ | 680pf ± 1% |
| $C_{2a}$, $C_{2b}$ | 1.5–16pf |
| $C_3$ | 0.047μF ± 10% |

Figure 6A:
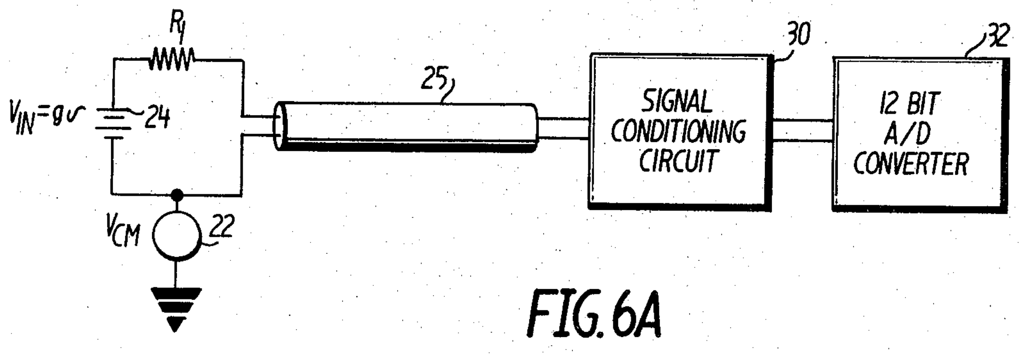
FIGS. 6 A, and 6 B and 6 C are, respectively, a circuit diagram showing a test circuit for demonstrating the capabilities of the circuit shown in FIG. 5, and the results obtained from testing upon such a circuit.
Figure 6B:
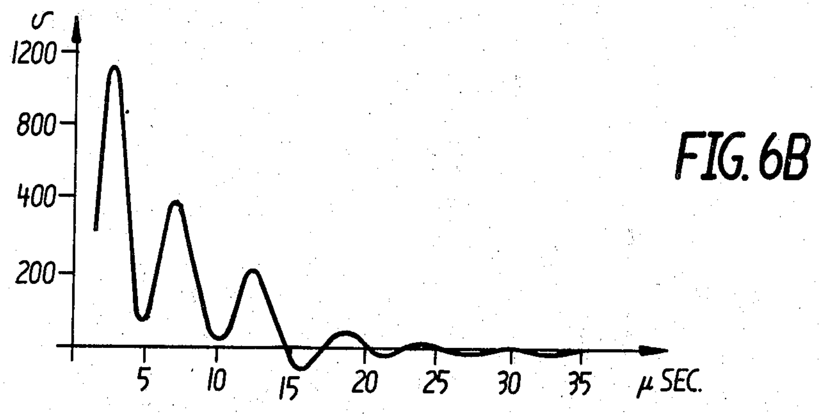
Figure 6C:
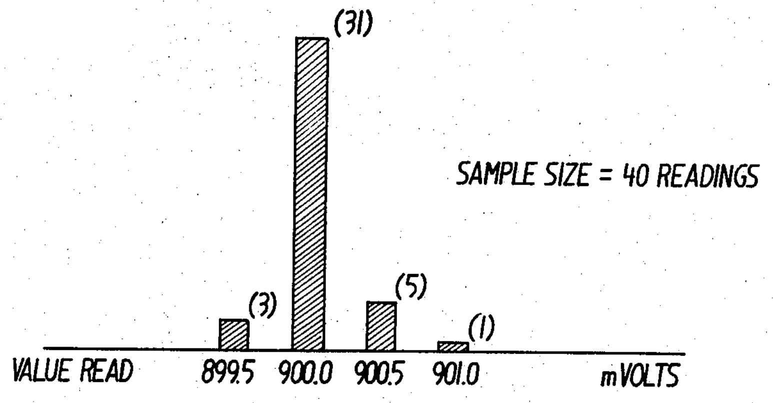

With regard to FIG. 6A, there is shown a test circuit whereby a high voltage, impulsive noise generator 22, simulating impulsive common mode interference, applies a high amplitude pulse along a cable 25 to the signal conditioning circuit 30 as shown in FIG. 5. The test circuit further includes a 9V battery 24 and an unbalanced resistive element $R_1$. In a manner as more fully described in the above-identified co-pending application, the output of the signal conditioning circuit is applied to a 12-bit analog-to-digital converter 32 for providing a binary representation of the input signal. As shown in FIG. 6B, a pulse of 1,200V is developed by the generator 22 and applied through the cable 25 to the signal conditioning circuit 30. The output of the signal conditioning circuit 30 is represented by the graph depicted in FIG. 6B. Though a 1,200V peak value is indicated, peak values as high as 2,000V were successfully used. The analog-to-digital converter 32 is of the dual slope type with an integration time of one-sixtieth second as more fully described in the above-identified co-pending application. The repetition rate of the impulsive noise derived from the generator 22 is such that at least one noise burst or pulse occurred during each analog-to-digital conversion. A histogram depicting the distribution of output signals obtained in forty separate readings is shown in FIG. 6C. Significantly, only one reading of the forty deviated by 0.1 percent from its true value.

Thus, there has been shown and described a signal conditioning circuit capable of replacing expensive, floating instrumentation devices and yet able of substantially suppressing common mode noise that occurs typically in high-noise environments. More specifically, there has been described an amplifier having an input network whereby input signals including high-amplitude, impulsive common mode noise is attenuated to be within the operating range of the amplifier and a second network for increasing the gain of the amplifier to compensate for the previous attenuation.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. The method of critically calibrating the components of a noise suppressing circuit comprising an operational amplifier having an off-set adjustment, first and second inputs and an output, a first resistive element for applying a first input signal to the first input of the operational amplifier, a second resistive element for applying a second input signal to the second input of the operational amplifier, a third resistive element interconnected between the second input terminal and ground, fourth and fifth resistive elements connected between the output and the first input of the operational amplifier, and a sixth resistive element interconnected between the point of interconnection between the fourth and fifth resistive elements, and ground, said method comprising the steps of:

a. applying a zero voltage signal to the first and second inputs, adn adjusting the off-set of the operational amplifier to provide a zero voltage output therefrom;

b. applying after step (a) a zero voltage signal to the second input and adjusting the value of the sixth resistive element to obtain an output signal of a value such that the ratio of the output to the input signal applied to the first input is a predetermined value; and c. applying after step (b) a predetermined DC voltage simultaneously to each of the first and second inputs of the operational amplifier and adjusting the third resistive element to provide a zero output from the operational amplifier.

2. The method of calibration as claimed in claim 1, wherein the noise suppressing circuit includes first and second capacitive elements respectively connected from the first and second inputs to circuit ground, said method further comprising the step of:

after step (c), applying simultaneously a predetermined AC voltage to each of said first and second resistive elements and adjusting at least one of the first and second capacitive elements to provide a zero voltage output from the operational amplifier.

* * * * *